(12) United States Patent
Abe (10) Patent No.: US 7,673,996 B2
(45) Date of Patent: Mar. 9, 2010

(54) IMAGE PROJECTION APPARATUS AND IMAGE PROJECTION SYSTEM

(75) Inventor: Tsutomu Abe, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 488 days.

(21) Appl. No.: 11/802,743

(22) Filed: May 24, 2007

(65) Prior Publication Data

US 2008/0151129 A1 Jun. 26, 2008

(30) Foreign Application Priority Data

Dec. 22, 2006 (JP) ............................. 2006-345834

(51) Int. Cl.
  *G03B 21/22* (2006.01)
(52) U.S. Cl. .................... 353/119; 353/97; 348/744; 348/789; 250/239
(58) Field of Classification Search ................ 353/119, 353/97, 98; 348/744, 781, 878, 789; 250/216, 250/239
See application file for complete search history.

(56) References Cited

U.S. PATENT DOCUMENTS

2004/0070674 A1 4/2004 Foote et al.

2008/0036897 A1 * 2/2008 Abe et al. .................... 348/335

FOREIGN PATENT DOCUMENTS

| JP | A 09-005663 | 1/1997 |
| JP | A-2005-33756 | 2/2005 |
| JP | A-2006-23415 | 1/2006 |
| JP | A-2006-251206 | 9/2006 |
| JP | A-2007-52216 | 3/2007 |

\* cited by examiner

*Primary Examiner*—Kevin Pyo
(74) *Attorney, Agent, or Firm*—Oliff and Berridge, PLC (57) ABSTRACT

An image projection apparatus includes: an imaging portion that takes an image of an object; an optical element that is disposed halfway on an optical path between the object and the imaging portion, and that branches the optical path; a projection portion that projects image light onto the object through the optical element; a dust prevention cover that includes an opening on an optical axis between the object and the optical element, and that covers at least the optical element to protect the optical element from dust; and a transparent dust prevention member that is provided in the dust prevention cover to close the opening, and that has a reflection surface preventing reflection light, which is obtained by receiving the image light from the projection portion and reflecting the image light, from being incident on an entrance pupil of the imaging portion.

8 Claims, 12 Drawing Sheets

IMAGE PROJECTION APPARATUS AND IMAGE PROJECTION SYSTEM

CROSS-REFERENCE TO RELATED APPLICATIONS

This application is based on and claims priority under 35 U.S.C. 119 from Japanese Patent Application No. 2006-345834 filed Dec. 22, 2006.

BACKGROUND

1. Technical Field

The present invention relates to an image projection apparatus and an image projection system.

2. Related Art

A coaxial illumination image-taking apparatus miniaturized by partly sharing an optical path between an illumination system and an image-taking system is known.

This conventional coaxial illumination image-taking apparatus has a housing provided with an opening, a camera disposed in the housing so that an optical axis thereof passes through the opening, a half mirror disposed in the housing to be placed on the optical axis of the camera, a light emitting diode disposed in the housing so that output light thereof is reflected by the half mirror, and that the reflected light is output externally from the opening, a light attenuation filter which is disposed to be inclined to the optical axis of the light emitting diode and is adapted to attenuate light rays transmitted by the half mirror among light rays output from the light emitting diode, and a nonreflecting element disposed on the optical axis of light reflected by the light attenuation filter.

According to the coaxial illumination image-taking apparatus, a part of light emitted from the light emitting diode is reflected by the half mirror and is externally output from the opening. However, light transmitted by the half mirror reaches the light attenuation filter and is then attenuated. Light having been insufficiently attenuated is absorbed by the nonreflecting element. Thus, a part of the light emitted from the light emitting diode can be suppressed from becoming stray light. Also, the stray light can be prevented from being incident upon the camera.

SUMMARY

According to an aspect of the present invention, an image projection apparatus comprising: an imaging portion that takes an image of an object; an optical element that is disposed halfway on an optical path between the object and the imaging portion, and that branches the optical path; a projection portion that projects image light onto the object through the optical element; a dust prevention cover that includes an opening on an optical axis between the object and the optical element, and that covers at least the optical element to protect the optical element from dust; and a transparent dust prevention member that is provided in the dust prevention cover to close the opening, and that has a reflection surface preventing reflection light, which is obtained by receiving the image light from the projection portion and reflecting the image light, from being incident on an entrance pupil of the imaging portion.

BRIEF DESCRIPTION OF THE DRAWINGS

Exemplary embodiment of the present invention will be described in detail based on the following figures, wherein.

DETAILED DESCRIPTION

First Embodiment

Figure 1:
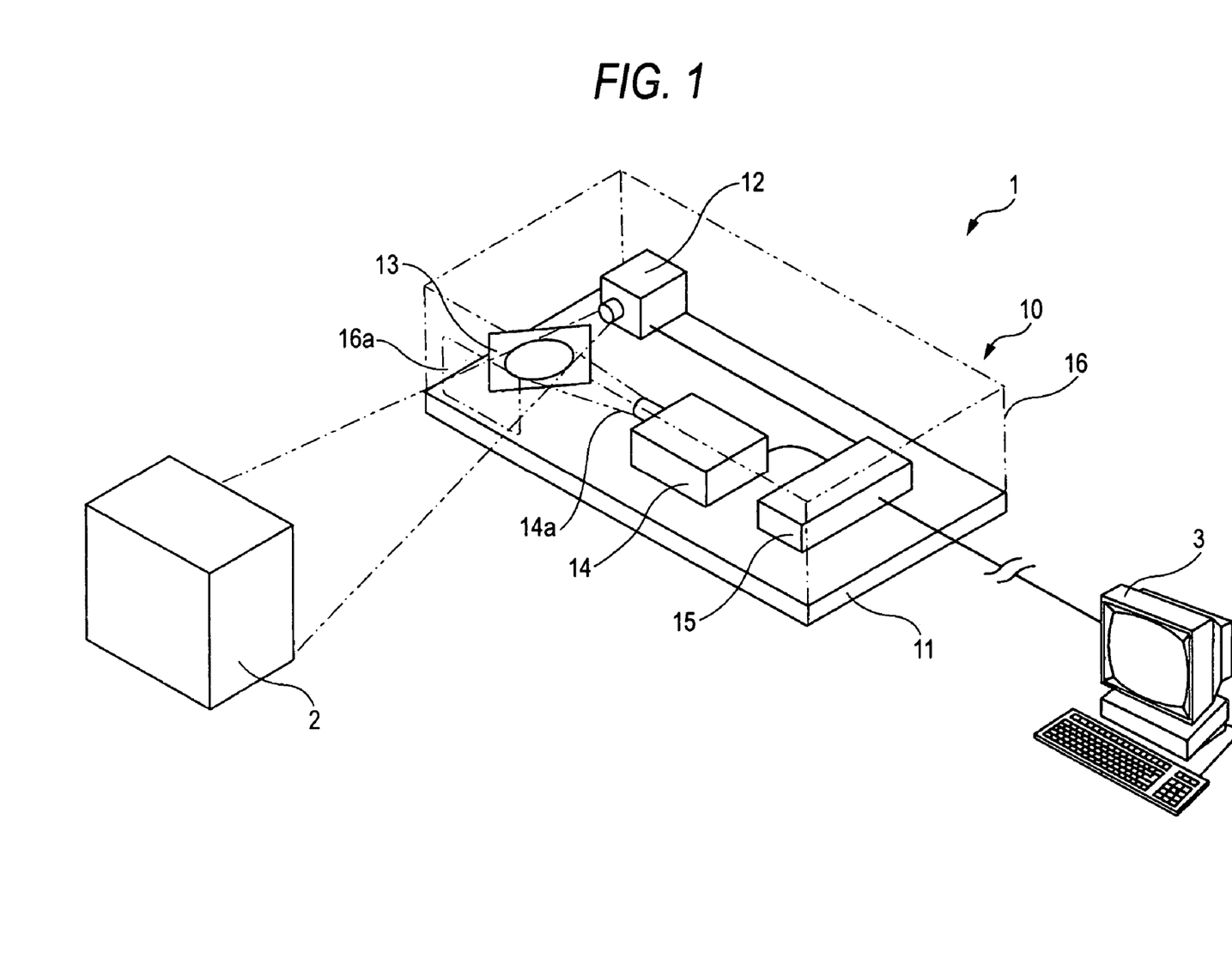
FIG. 1 is a perspective view illustrating the external appearance of an image projection system according to a first embodiment of the invention.

FIG. 1 is a perspective view illustrating the external appearance of an image projection system according to a first embodiment of the invention. In FIG. 1, a casing is indicated by imaginary lines.

The image projection system 1 includes an image projection apparatus 10 which has an imaging system configured to image an object 2 and which also has a projection system configured to project image light 14a representing an annotation image onto the object 2, and also includes a terminal apparatus 3 configured to remotely control the image projection apparatus 10. The object 2 can be a stereoscopic one, such as an industrial product or a model, and a planar one, such as a screen.

The image projection apparatus 10 has a base 11. Also, a camera (an imaging portion) 12 configured to image an object 2, a half mirror (corresponding to the optical element) 13 which is provided halfway on an optical path extending between the object 2 and the camera 12 and is configured to branch the optical path, a projector (corresponding to the projection portion) 14 configured to project image light 14a onto the object 2 through the half mirror 13, and a server (corresponding to the control unit) 15 configured to relay signals among the camera 12, the projector 14, and the terminal apparatus 3 are disposed on the base 11. The camera 12, the half mirror 13, the projector 14, and the server 15 are covered with a casing 16. A window 16a is formed in the casing 16 so as not to interfere the optical paths extending from the camera 12 and the projector 14.

Incidentally, the server 15 may be provided separately from and independent of the image projection apparatus 10. In this case, plural image projection apparatuses can be connected to the server 15.

The camera 12 employs, for example, a CCD (Charge-Coupled Device) or a CMOS (Complementary Metal-Oxide Semiconductor) as a light receiving element.

For example, a liquid crystal projector using a liquid crystal panel as a spatial light modulator is employed as the projector 14. Incidentally, in addition to the liquid crystal projector, a projector using a two-dimensional micro-mirror-array as the spatial light modulator, and a time-sharing type projector using a color wheel can be employed.

Figure 2:
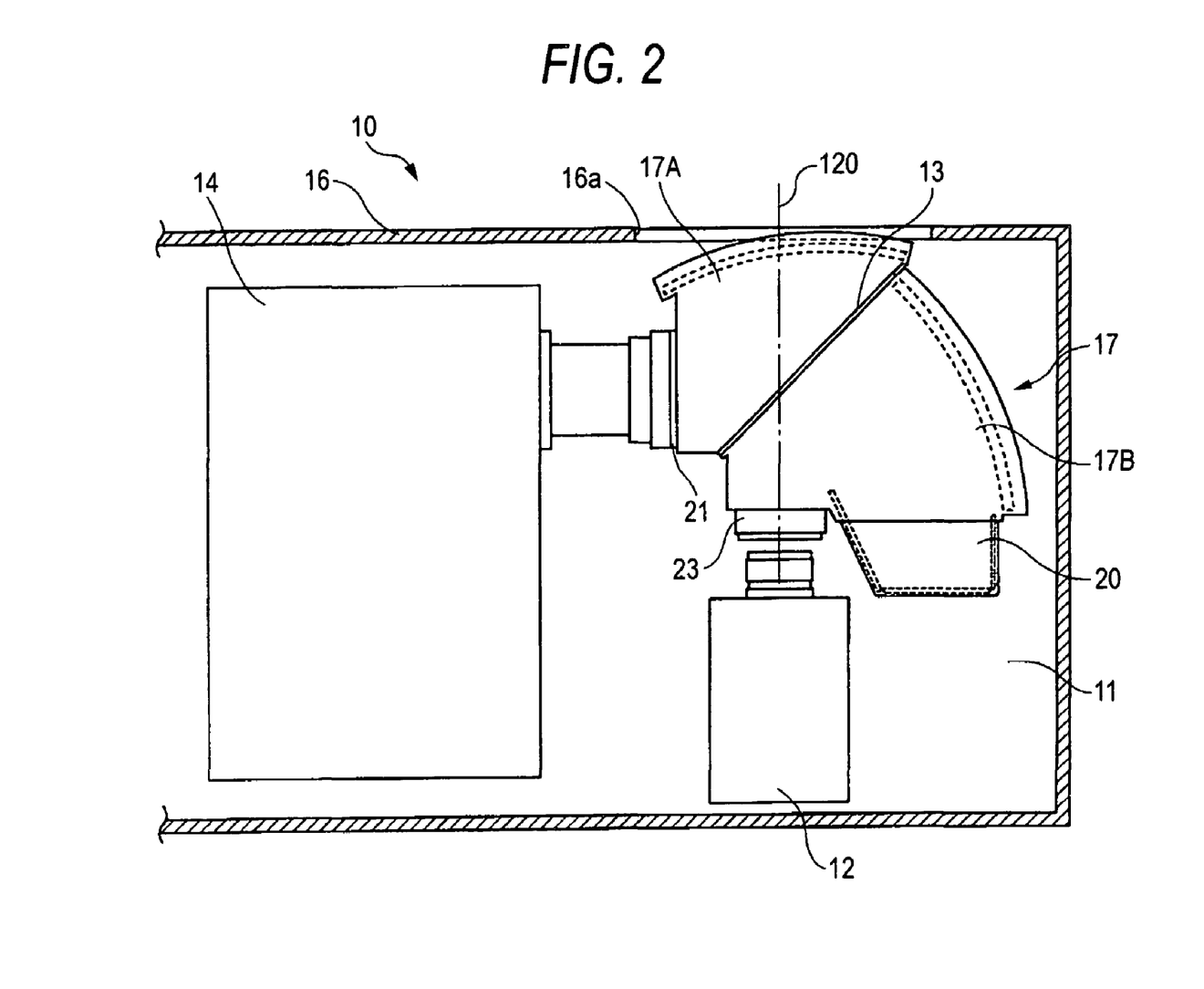
FIG. 2 is a plan view illustrating the inside of the image projection apparatus.
Figure 3:
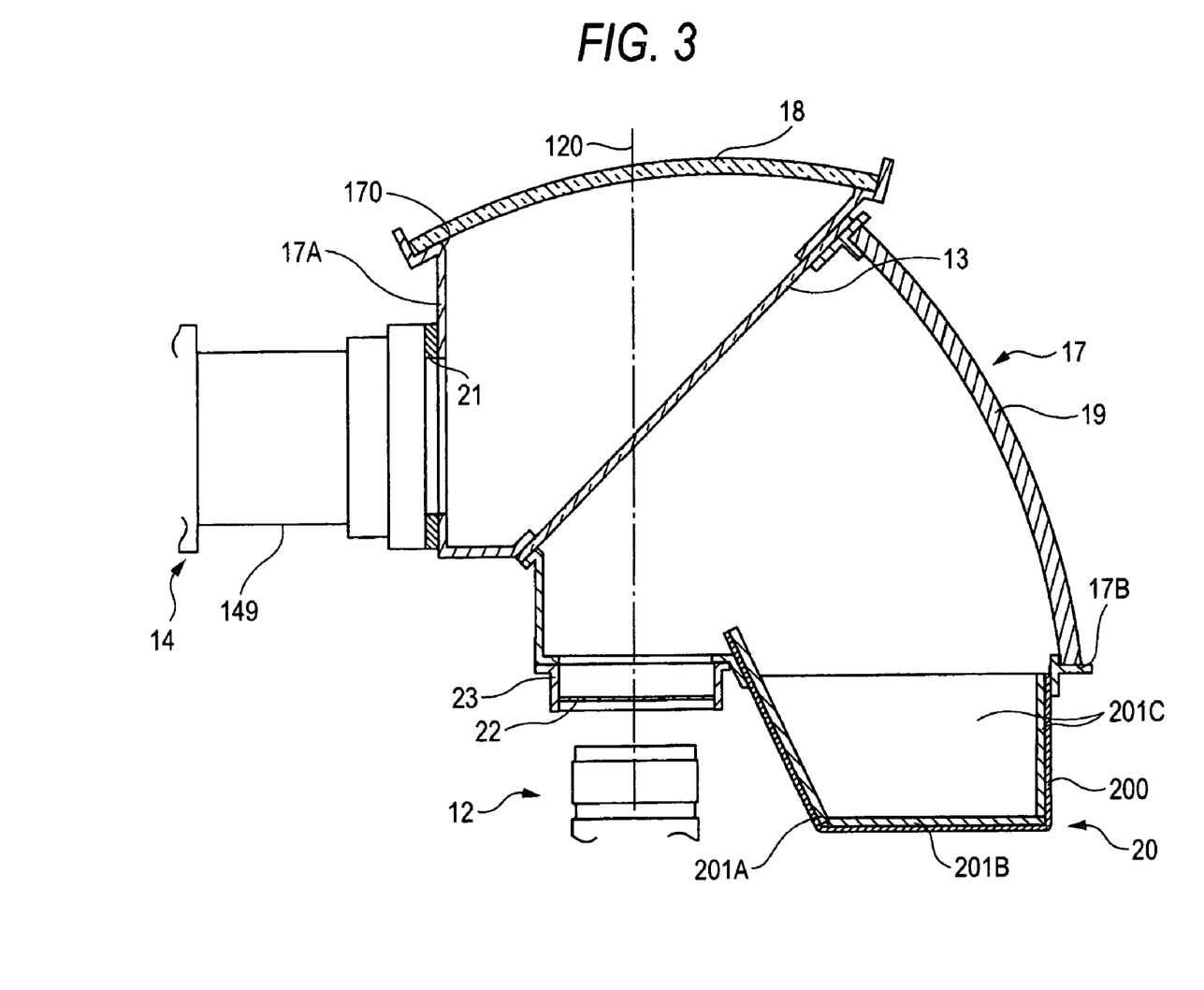
FIG. 3 is a cross-sectional view illustrating a dust prevention cover.

FIG. 2 is a plan view illustrating the inside of the image projection apparatus 10. FIG. 3 is a cross-sectional view illustrating a dust prevention cover. The image projection apparatus 10 has a dust prevention cover 17 which protects a half mirror 13 from dust by covering the half mirror 13. The dust prevention cover 17 has a structure including a first dust prevention cover 17A and a second prevention cover 17B which sandwich the half mirror 13.

The first dust prevention cover 17A is made of resin and metal, and has an opening 170 at the side of a window 16a. The first dust prevention cover 17A holds a transparent dust prevention member 18 to close the opening 170. A projection lens unit 149 is put into contact with the first dust prevention cover 17A from a direction perpendicular to the optical axis 120 through a packing 21.

The second dust prevention cover 17B is made of resin and metal, and holds a concave mirror (corresponding to the reflection optical element) 19. A holding element 23 to which a glass plate 22 is attached, and a light attenuation portion 20 are attached to the second dust prevention cover 17B.

(Light Attenuation Portion)

The light attenuation portion 20 is an area, in which light reflected by the transparent dust prevention member 18 are collected, and is provided in an area in which light reflected by a concave mirror 19 is collected. As shown in FIG. 3, the light attenuation portion 20 includes a boxlike support plate 200 made of resin, metal or the like, a light attenuation filter 201A provided on the inner side of an inclined surface of the support plate 200, a light attenuation filter 201B provided on the bottom surface of the support plate 200, a light attenuation filter 201C provided on the inside of each of three vertical surfaces of the support plate 200. The details of the configuration of each of the light attenuation filters 201 (201A, 201B, and 201C) will be described later.

(Transparent Dust Prevention Member)

Figure 4:
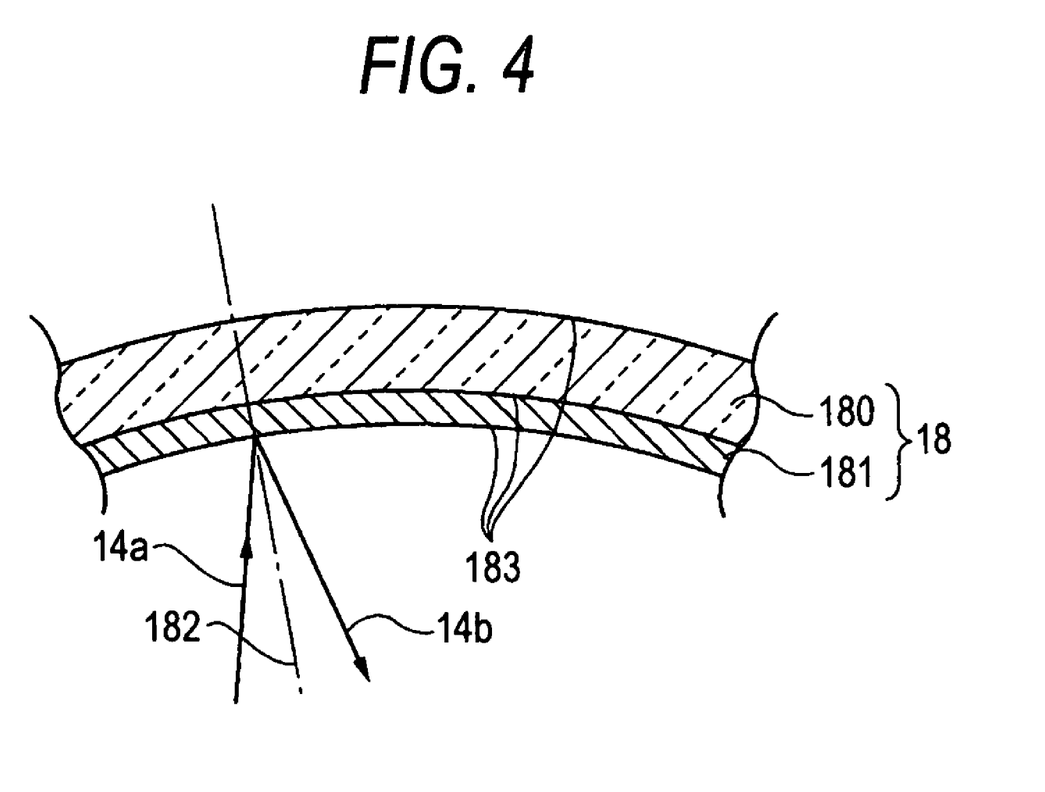
FIG. 4 is a cross-sectional view illustrating a primary part of a transparent dust prevention member.

FIG. 4 is a cross-sectional view illustrating a primary part of the transparent dust prevention member. The transparent dust prevention member 18 has a transparent glass plate 180 and an AR (Anti-Refection) coating 181 formed on the inner side of the glass plate 180. Incidentally, the configuration of the transparent dust prevention member 18 is not limited to that shown in FIG. 4.

The glass plate 180 is made of synthetic quarts (BK7), or optical white sheet glass.

The AR coating 181 is formed by alternately stacking dielectric layers of, for example, $SiO_2$, $TiO_2$, $Al_2O_3$, $MgF_2$ having different refraction indexes, respectively. The AR coating 181 has the function of suppressing reflection light 14b utilizing interference effect of light. The present embodiment employs the AR coating 181 having a reflectivity of 0.3%.

The transparent dust prevention member 18 includes a reflection surface 183 having a normal line 182 extending in a direction different from the direction of reflection light 14b to prevent the reflection light 14b, which is obtained by reflecting image light 14a received from a projector 14, from being incident upon an entrance pupil (The entrance pupil shows an image of an aperture stop as viewed from an object side. If a stop do not exist in an optical system, the entrance pupil shows an aperture itself of an objective lens) of the camera 12. A surface, on which the reflection surface 183 is present, is not limited to the inner surface of the transparent dust prevention member 18, as illustrated in FIG. 4. The reflection surface 183 can be present on the boundary face between the glass plate 180 and the AR coating 181. Alternatively, the reflection surface 183 can be present on the outer surface of the glass plate 180.

More specifically, the transparent dust prevention member 18 protrudes toward an opening 170 and has a curved shape, for example, an arc-like shape having a curvature set to be equal to the distance to the center of the entrance pupil of the camera 12. The direction of the transparent dust prevention member 18 with respect to the optical axis 120 is changed toward the concave mirror 19 so that the position of an image of the entrance pupil of a projection lens unit 149, which is formed by the transparent dust prevention member 18, is outside the entrance pupil of the camera 12. Incidentally, the direction of the transparent dust prevention member 18 is directed toward between the camera 12 and the projector 14.

The curvature of the transparent dust prevention member 18 is set to be equal to the distance to the center of the entrance pupil. Consequently, even when the transparent dust prevention member 18 is inclined, the influence of the transparent dust prevention member 18 at the center of the image light ray 14a is equivalent to that of the transparent dust prevention member 18 at the periphery of the image light ray 14a. Thus, the influence of a projected image and a taken image is negligible.

An angle, at which the transparent dust prevention member 18 is inclined, is set so that the size, the position, the distortion aberration amount, and the image position change amount of the image of the entrance pupil of the projection lens unit 149 are within a tolerance range. Preferably, the inclination angle ranges from 5 degrees to 10 degrees. According to the present embodiment, the inclination angle is set to be 7.5 degrees.

The exit pupil of the projector 14 and the entrance pupil of the camera 12 are disposed across the half mirror 13 at optically conjugate positions. Especially, in the present embodiment, the field angles thereof are set to be equal to each other.

(Light Attenuation Filter)

FIGS. 5A to 5D are cross-sectional views illustrating a primary part of the light attenuation filter. Various attenuation filters illustrated in FIGS. 5A to 5D can be used as the light attenuation filter 210. The light attenuation filter 210 is not limited to that shown in FIGS. 5A to 5D.

Figure 5A:
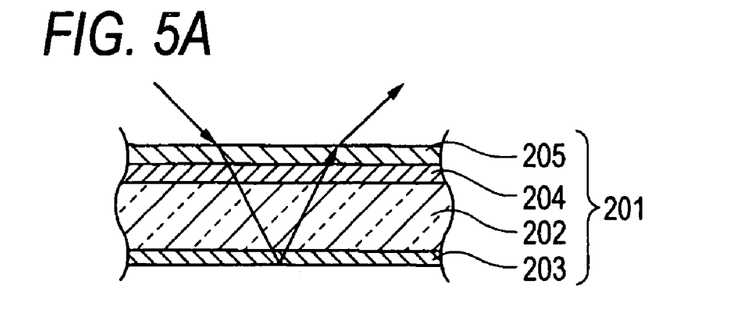
FIGS. 5A to 5D are cross-sectional views illustrating a primary part of an attenuation filter.

The light attenuation filter 210 shown in FIG. 5A includes a glass plate 201 made of glass quarts, an Al coating formed by depositing aluminum on the outer surface of the glass plate 201 to reflect light, an ND (Neutral Density) coating formed on the inner side of the glass plate 204, an AR (Anti-Reflection) coating 205 formed on the inner side of the ND coating 204.

The ND coating 204 is made of a metal, such as chrome, inconel, and aluminum. The ND coating 204 has the function of suppressing optical transmission of light. The present embodiment employs the ND coating having a transmissivity of 0.3%.

The AR coating 205 is formed by alternately stacking dielectric layers of, for example, $SiO_2$, $TiO_2$, $Al_2O_3$, $MgF_2$ having different refraction indexes, respectively. The AR coating 181 has the function of suppressing reflection light 14b utilizing interference effect of light. The present embodiment employs the AR coating 181 having a reflectivity of 0.5%.

Figure 5B:
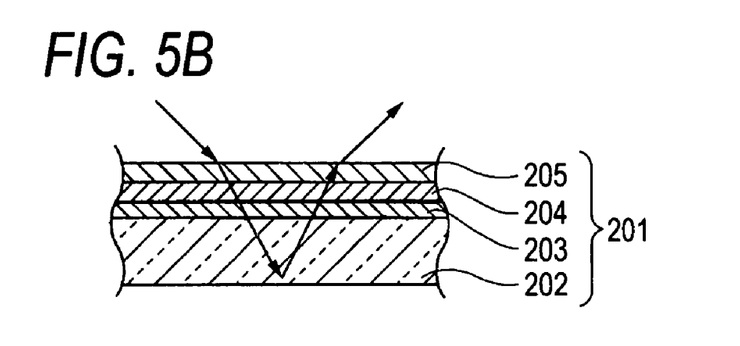

The light attenuation filter 201 shown in FIG. 5B is obtained by forming an Al coating 203 on the inner side of the glass plate 202, differently from the light attenuation filter 201 shown in FIG. 5A.

Figure 5C:
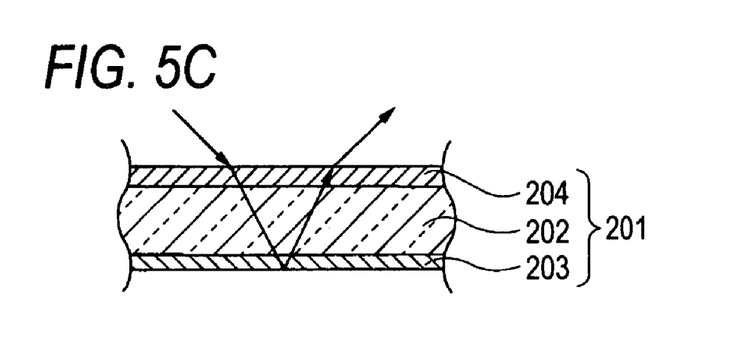

The light attenuation filter 201 shown in FIG. 5C is obtained by omitting an AR coating 205 from the light attenuation filter 201 shown in FIG. 5A.

Figure 5D:
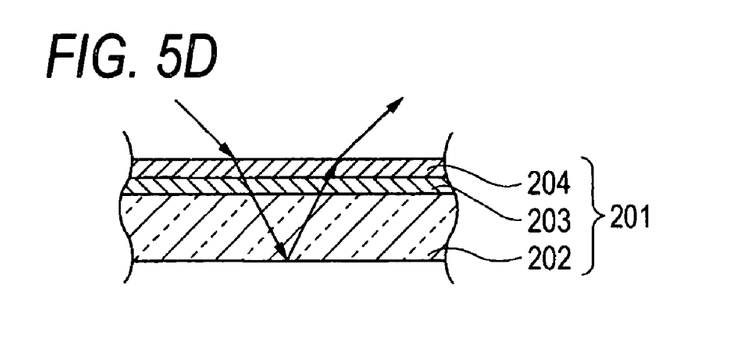

The light attenuation filter 201 shown in FIG. 5D is obtained by omitting an AR coating 205 from the light attenuation filter 201 shown in FIG. 5B.

For example, when light reaches the light attenuation filter 201 shown in FIG. 5A, the light is branched into reflection light reflected by the AR coating 205 and light transmitted by the AR coating 205. The transmitted light is attenuated by the ND coating 204, and is then transmitted by the glass plate 202. Subsequently, the transmitted light is reflected by the Al coating 203 and is again attenuated by the ND coating 204. Subsequently, the light is externally output.

(Concave Mirror)

Figure 6:
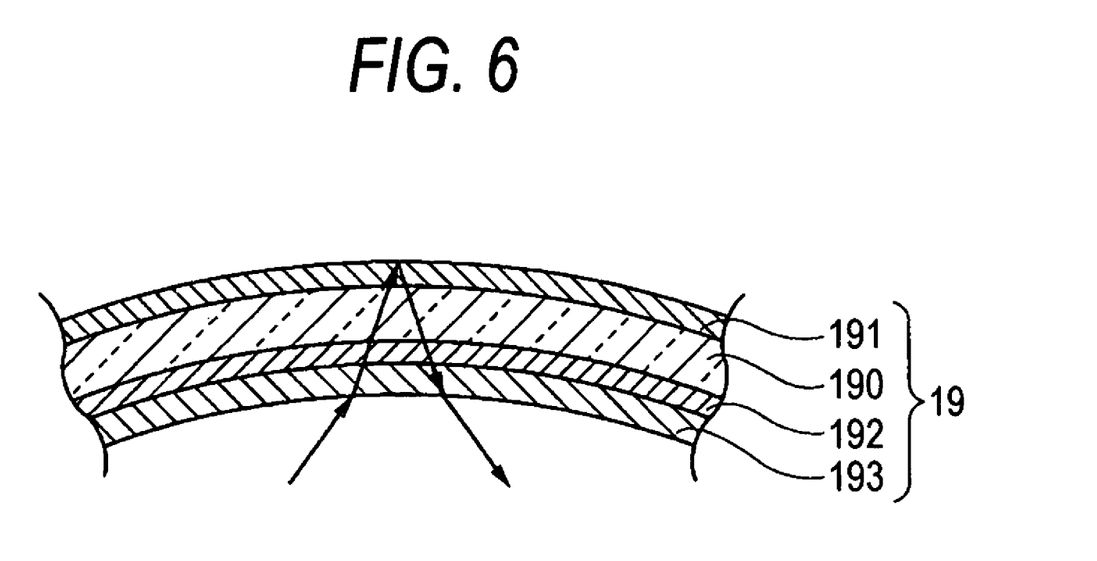
FIG. 6 is a cross-sectional view illustrating a primary part of a concave mirror.

FIG. 6 is a cross-sectional view illustrating a primary part of the concave mirror 19. The concave mirror 19 is cross-sectionally arc shape and includes a glass plate 190 made of quarts glass, an Al coating 191 formed on the outer surface of the glass plate 190, an ND (Neutral Density) coating 192 on the inner side of the glass plate 190, and an AR (Anti-Reflection) coating 193 formed on the inner side of the ND coating 192. The concave mirror 19 is not limited to that shown in FIG. 6.

The Al coating 191, the ND coating 192, and the AR coating 193 are similar to the Al coating 203, and the ND coating 204 and the AR coating 205 of the light attenuation filter 210, respectively.

The concave mirror 19 can be formed, similarly to the filters shown in FIGS. 5B to 5D.

(Projector)

Figure 7:
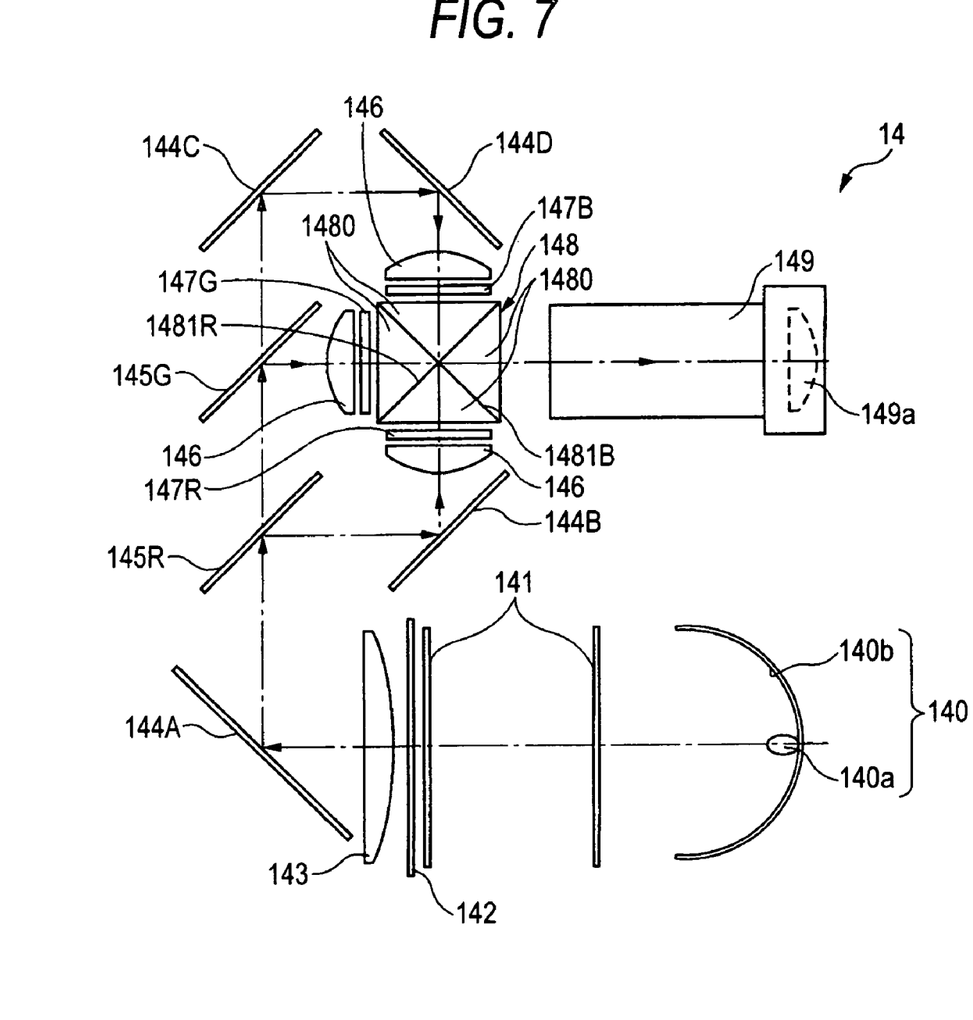
FIG. 7 is a view illustrating a projector.

FIG. 7 is a view illustrating the configuration of a projector 14. The projector 14 is reduced in the length in the direction in which image light 14a is output. The projector 14 includes a light source portion 140, a light integrator 141 configured to uniformize light output from the light source portion 140, a polarization beam splitter 142 configured to unify the polarization direction of the uniformized light, a field lens 143 configured to shape the light, the polarization direction of which is unified, into parallel light rays, a total reflection mirror 144A configured to perform the total reflection of light output from the field lens 143, a dichroic mirror 145R configured to reflect an R-component among components of light reflected by the total reflection mirror 144A and to transmit a G-component and a B-component, a total reflection mirror 144B configured to perform the total reflection of the R-component reflected by the dichroic mirror 145R, a dichroic mirror 145G configured to reflect a G-component among components of light transmitted by the dichroic mirror 145R and to transmit a B-component, total reflection mirrors 144C and 144D configured to perform the total reflection of the B-component light transmitted by the dichroic mirror 145G, field lenses 146 configured to shape each of the R-component light totally reflected by the total reflection mirror 144B, the G-component light reflected by the dichroic mirror 145G, and the B-component light reflected by the total reflection mirror 144D into parallel light rays, liquid crystal panels 147R, 147G, and 147B each of which modulates the parallel light rays according to R-, G-, and B-image signals into R-, G-, and B-image light rays, a synthesis prism 148 configured to synthesize R-, G-, and B-image light, and a projection lens unit 149 having plural projection lenses 149a configured to project the R-, G-, and B-image light onto an object 2.

The light source portion 148 includes a light emitting element 140a, such as a xenon lamp, a halogen lamp, or a metal halide lamp, and a reflector 140b which is constituted by a parabolic mirror and frontwardly reflects light beams rearwardly emitted from a light emitting element 140a as substantially parallel light rays.

The synthesis prism 148 is bonding two side surfaces of four right angle prisms 1480, which are formed to be right triangle-shaped in cross-section, and forming a dichroic layer 1481B, which reflects the B-component light, and a dichroic layer 1481R, which reflects the R-component light, on bonding-surfaces, respectively.

Figure 8:
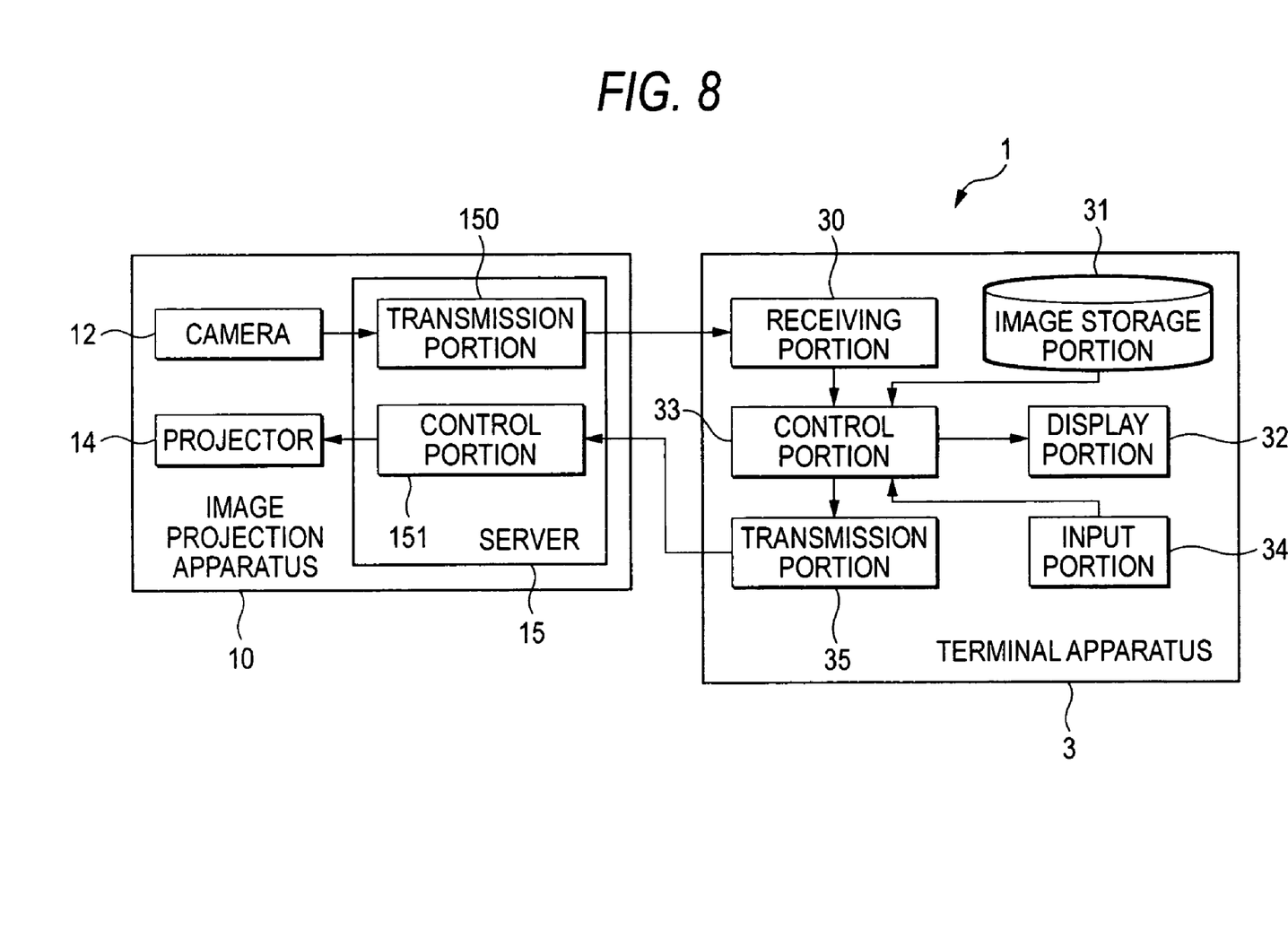
FIG. 8 is a block view illustrating a control system of an image projection system according to a first embodiment of the invention.

FIG. 8 is a block view illustrating a control system of the image projection system 1 according to a first embodiment of the invention. The server 15 includes a transmission portion 150 configured to transmit an image taken by the camera 12 to the terminal apparatus 3, and also includes a control portion 151 configured to perform an image projection control operation on the projector 14.

The terminal apparatus 3 includes a receiving portion 30 configured to receive a taken image transmitted from the transmission portion 150 of the server 15, an image storage portion 31 configured to store an annotation image, a display portion 32 configured to display the taken image, a control portion 33 configured to control each of the portions of the terminal apparatus 3, an input portion 34 constituted by a keyboard and a mouse, and a transmission portion 35 configured to transmit an image drawing command to the server 15. The terminal apparatus 3 can be implemented by, for example, a computer.

(Operation of Image Projection System)

Next, an operation of the image projection system 1 is described below. The camera 12 takes an image of the object 2. When the taken image is transmitted therefrom to the server 15, the transmission portion 150 of the server 15 transmits the taken image to the receiving portion 30 of the terminal apparatus 3. The control portion 33 of the terminal apparatus 3 displays the taken image in the display portion 32. An operator of the terminal apparatus 3 operates the input portion 34 to select an annotation image corresponding to the taken image displayed in the display portion 32. The control portion 33 reads the selected annotation image from the image storage portion 31 and superposes the read annotation image on the taken image displayed in the display portion 32. Also, the control portion 33 causes the transmission portion 35 to transmit an image drawing command corresponding to the selected annotation image. The control portion 151 of the server 15 performs an image projection control operation corresponding to the drawing command. The projector 14 projects an annotation image as image light 14a under the control of the control portion 15 which performs the image projection control operation.

That is, light output from the light source portion 140 is incident on the dichroic mirror 145R through the light integrator 141, the light integrator 141, the polarization beam splitter 142, the polarization beam splitter 142, the field lens 143, and the total reflection mirror 144A. Then, the incident light is split by the dichroic mirror 145R into reflection light (i.e., the R-component) and transmitted light (i.e., the G-component and the B-component). The R-component light is incident on the liquid crystal panel 147R through the field lens 146.

The G-component light and the B-component light transmitted by the dichroic mirror 145R are split by the dichroic mirror 145G into reflection light (G-component light) and transmitted light (B-component light). This G-component light is incident on the liquid crystal panel 147G through the field lens 146.

The B-component light transmitted by the dichroic mirror 145G is incident on the liquid crystal panel 147B through the total reflection mirrors 144C, and 144D, and the field lens 146.

The R-, G-, and B-light incident on the liquid crystal panels 147R, 147G, and 147B are modulated by according to the R-, G, and B-image signals. Then, color image light is synthesized by the synthesis prism 148. The annotation image is projected by the projection lens unit 149 onto the object 2 as color image light 14a through the half mirror 13 and the transparent dust prevention member 18.

Figure 9:
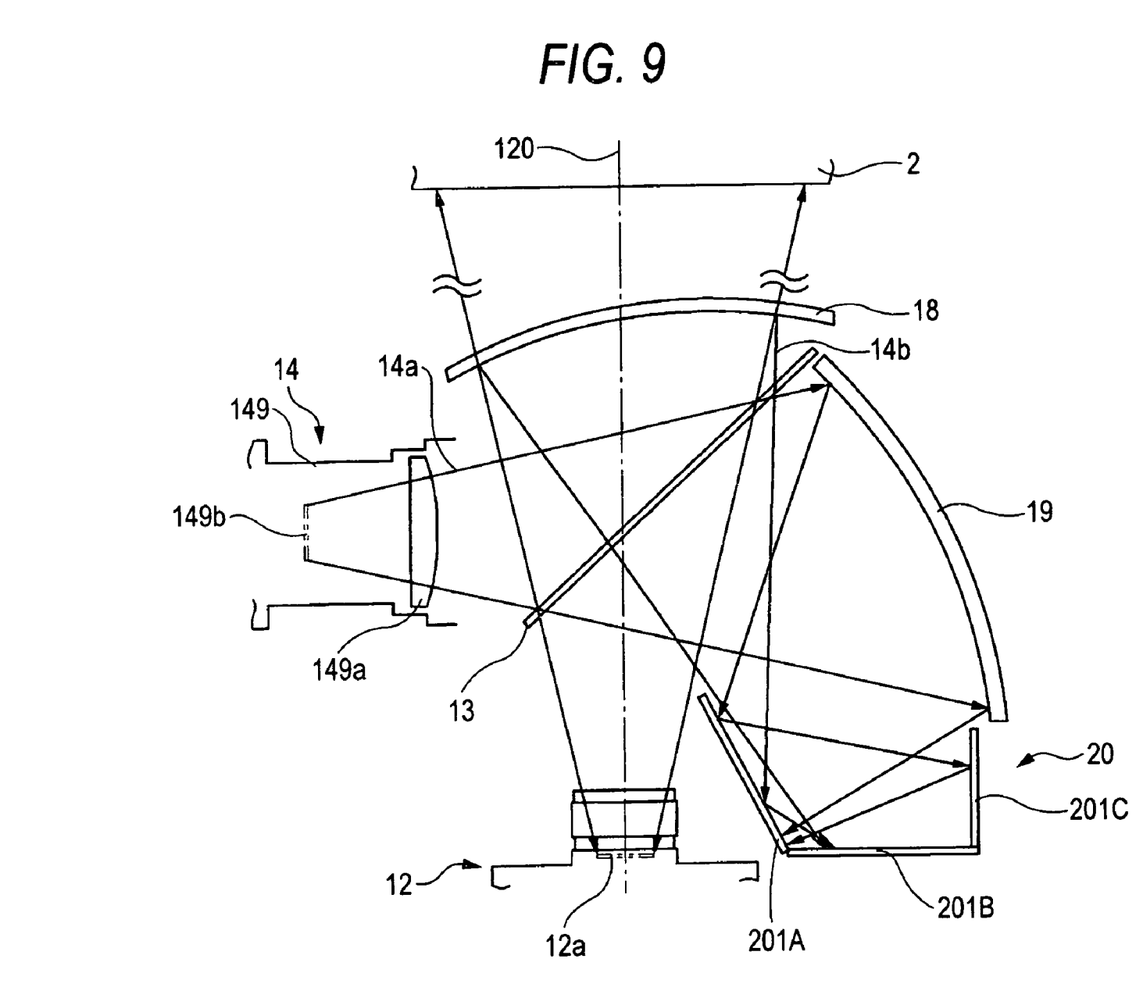
FIG. 9 is a block view illustrating an optical system of the image projection system according to the first embodiment of the invention.

FIG. 9 illustrates an optical system of the image projection apparatus 10. When the image light 14a outputted from the projector 14 reaches the half mirror 13, the image light 14a is split by the half mirror 13 into reflection light and transmitted light. The reflection light is projected onto the object 2 by being transmitted by the transparent dust prevention member 18. When the image light 14a projected from the projector 14 is transmitted by the transparent dust prevention member 18, a part of the image light 14a is reflected by the transparent dust prevention member 18. Reflection light 14b reflected by the transparent dust prevention member 18 is transmitted by the half mirror 13 and is collected to a narrow area, because the transparent dust prevention member 18 is shaped like an arc in cross-section. Then, the light 14b reaches the light attenuation filter 201 and is then attenuated. Part of the light having reached the light attenuation filter 201 is attenuated therein. However, the remaining part of this light is reflected and directed to the other light attenuation filter 201. Subsequently, this light is iteratively reflected between the light attenuation filters 201. Thus, this light is gradually attenuated.

Meanwhile, a part of the image light 14a output from the projector 14 is transmitted by the half mirror 13 and is reflected by the concave mirror 19. The light reflected by the concave mirror 19 is collected to a narrow area, because the transparent dust prevention member 18 is shaped like an arc in cross-section. Then, the light reaches the light attenuation filter 201 and is then attenuated. Part of the light having reached the light attenuation filter 201 is attenuated therein. However, the remaining part of this light is reflected and directed to the other light attenuation filter 201. Subsequently, this light is iteratively reflected between the light attenuation filters 201. Consequently, this light is gradually attenuated.

Second Embodiment

Figure 10:
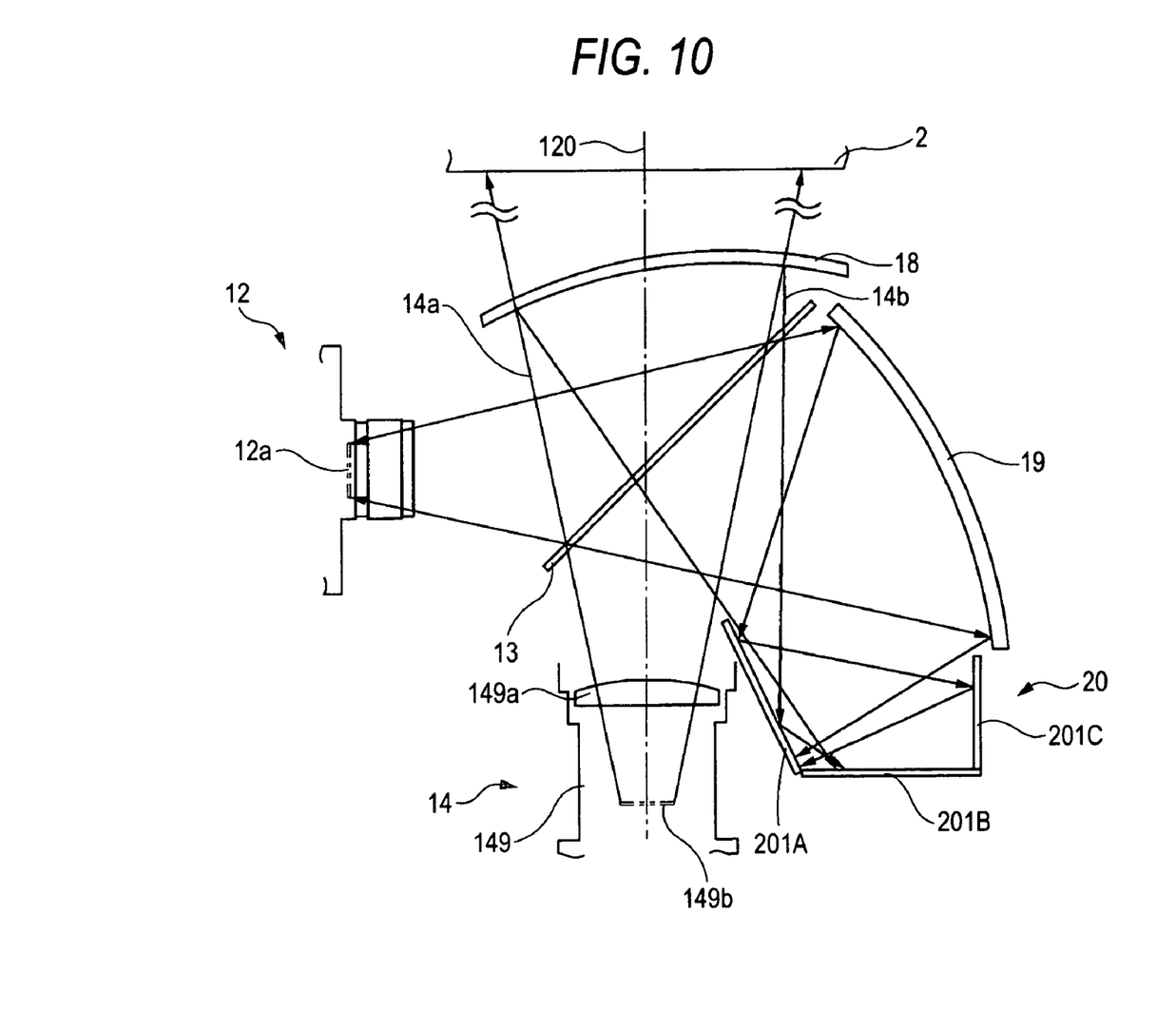
FIG. 10 is a block view illustrating an optical system of an image projection system according to a second embodiment of the invention.

FIG. 10 is a block view illustrating an optical system of an image projection system according to a second embodiment of the invention. The present embodiment is obtained by replacing the positions of the camera and the projector of the first embodiment. That is, the projector 14 is disposed on the optical axis 120 passing through the opening 170. Also, the camera 12 is disposed to be perpendicular to the optical axis 120. The rest of the second embodiment is similar to the associated part of the first embodiment.

The light output from the object 2 is reflected by the half mirror 13 and is incident on the entrance pupil 12a of the camera 12. Thus, the camera 12 takes an image of the object 2. Image light 14a output from the projector 14 is transmitted by the half mirror 13 and the transparent dust prevention member 18 and is projected onto the object 2.

When the image light 14a output from the projector is transmitted by the transparent dust prevention member 18, a part of the image light 14a is reflected by the transparent dust prevention member 18. The reflection light 14b reaches the light attenuation filter 201 and is attenuated therein, similarly to the first embodiment.

Additionally, a part of the image light 14a output from the projector 14 is reflected by the half mirror 13 and is further reflected by the concave mirror 19. Then, this part of the image light reaches the light attenuation filter 201 and is attenuated therein, similarly to the first embodiment.

Third Embodiment

Figure 11:
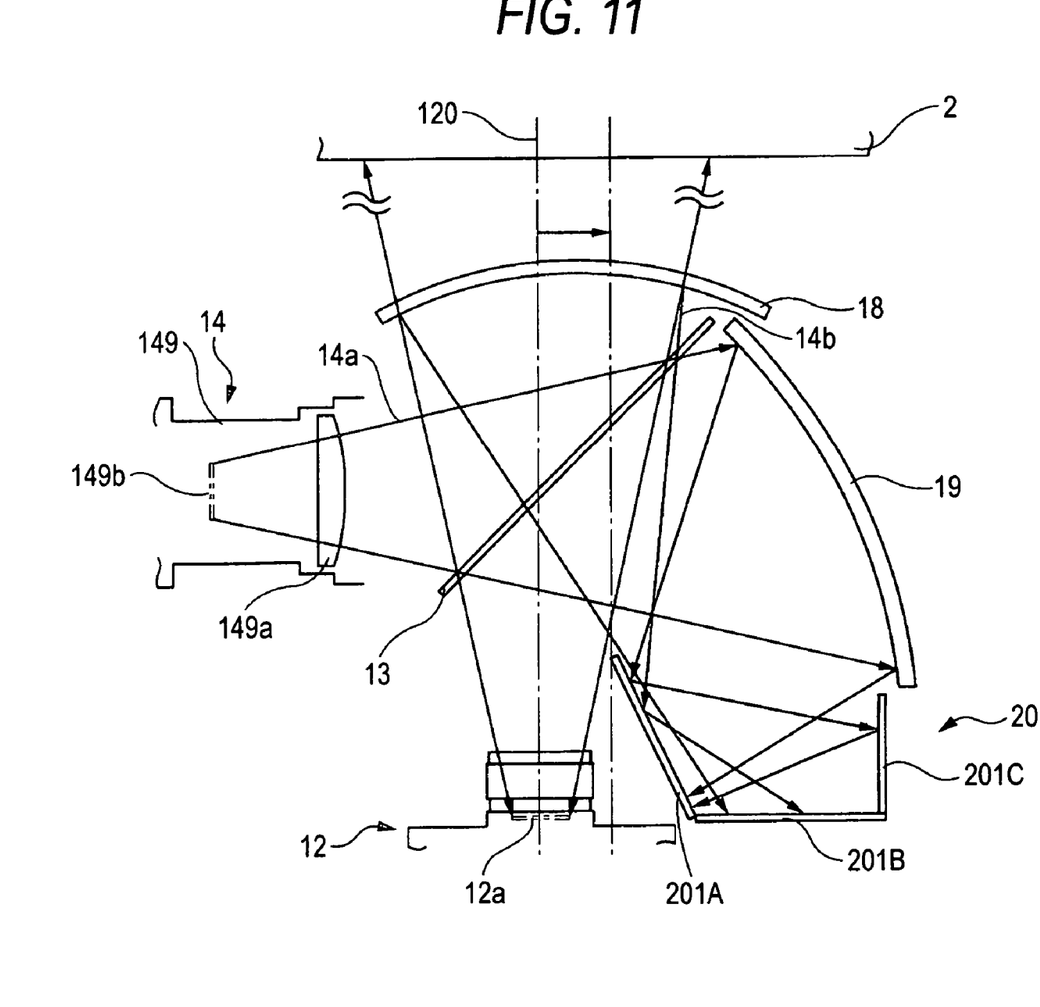
FIG. 11 is a block view illustrating an optical system of an image projection system according to a third embodiment of the invention.

FIG. 11 is a block view illustrating an optical system of an image projection system according to a third embodiment of the invention. The present embodiment is obtained by displacing the position of the cross-sectionally arc-like transparent dust prevention member 18 to the side of the concave mirror 19 without inclining the prevention member 18 to the optical axis 120. The rest of the third embodiment is configured, similarly to the associated part of the first embodiment.

The transparent dust prevention member 18 of the third embodiment has a normal line extending in a direction different from the direction of the reflection light 14b so that the reflection light 14b obtained by reflecting the image light 14a received from the projector 14 is prevented from being incident on the entrance pupil 12a. More specifically, the curvature of the transparent dust prevention member is set to be smaller than that of the transparent dust prevention member of the first embodiment.

In the third embodiment, reflection light 14b obtained by reflecting a part of image light 14a, which is output from the projector 14 and is illuminated onto the transparent dust prevention member 18, by the transparent dust prevention member 18 reaches the light attenuation filter 201 and is attenuated therein, similarly to the first embodiment. Also, a part of the image light 14a output from the projector 14 is transmitted by the half mirror 13. The transmitted part of the image light 14a is reflected by the concave mirror 19. The reflected light reaches the light attenuation filter 201 reaches the light attenuation filter 201 and is attenuated therein, similarly to the first embodiment.

Fourth Embodiment

Figure 12:
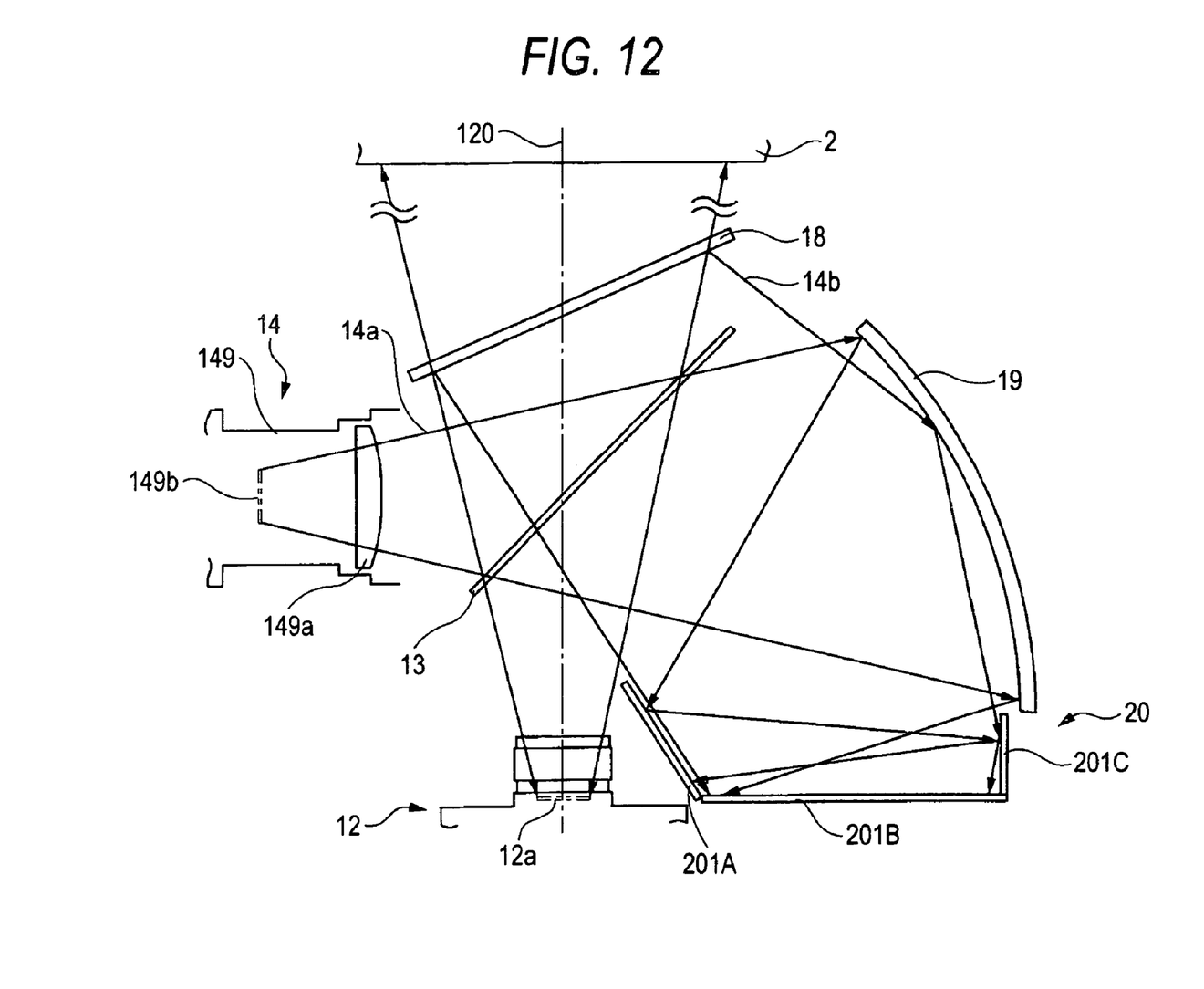
FIG. 12 is a block view illustrating an optical system of an image projection system according to a fourth embodiment of the invention.

FIG. 12 is a block view illustrating an optical system of an image projection apparatus according to a fourth embodiment of the invention. The present embodiment is obtained by using a flat transparent dust prevention member 18 instead of the cross-sectionally arc-like transparent dust prevention member 18 in the first embodiment and by changing the direction of the flat transparent dust prevention member 18 with respect to the optical axis 120 to the side of the concave mirror 19. The rest of the third embodiment is configured, similarly to the associated part of the first embodiment.

Even in a case where the flat transparent dust prevention member 18 is used in the fourth embodiment, the flat transparent dust prevention member 18 has a normal line extending in a direction different form the direction of the reflection light 14b so that the reflection light 14b obtained by receiving the image light 14a from the projector 14 and by reflecting the received image light is prevented from being impinged on the entrance pupil 12a of the camera 12 by inclining the transparent dust prevention member 18.

In the case of the fourth embodiment, the concave mirror 19 and the light attenuation portion 20 are increased in size, as compared with the first to third embodiments. However, the reflection light 14b obtained by reflecting a part of the image light 14a, which is output from the projector 14 and is illuminated on the flat transparent dust prevention member 18, at the dust prevention member 18 reaches the light attenuation filter 201 and is attenuated therein. Also, a part of the image light 14a, which is output from the projector 14 and is transmitted by the half mirror 13, is reflected by the concave mirror 19, and reaches the light attenuation mirror 201 and is attenuated therein, similarly to the first embodiment.

The invention is not limited to the above embodiments. Various modifications can be made without departing from the spirit or scope of the invention. For example, a half mirror is used in the above embodiments as an optical path splitting element. However, other optical elements, such as a beam splitter, can be used.

The dust prevention cover can be adapted to cover a part of the entire of the camera and the projector, in addition to the half mirror.

What is claimed is:

1. An image projection apparatus, comprising:
   an imaging portion taking an image of an object;
   an optical element disposed halfway on an optical path between the object and the imaging portion, the optical element branching the optical path;
   a projection portion projecting image light onto the object via the optical element;
   a dust prevention cover having an opening on an optical axis between the object and the optical element and protecting the optical element from dust by covering at least the optical element; and
   a transparent dust prevention member provided in the dust prevention cover to close the opening and having a reflection surface directed to a direction so that reflection light obtained by receiving the image light from the projection portion and reflecting the image light is not incident on an entrance pupil of the imaging portion.

2. The image projection apparatus according to claim 1, wherein the transparent dust prevention member has a shape curved and projected to the object and is disposed by changing a direction or a position thereof with respect to the optical axis.

3. The image projection apparatus according to claim 1, wherein the transparent dust prevention member has the reflection surface which is a substantially planar surface, and that the transparent dust prevention member is disposed by changing a direction with respect to the optical axis.

4. The image projection apparatus according to claim 1, wherein the transparent dust prevention member further comprises a layer which suppresses reflection.

5. The image projection apparatus according to claim 1, further comprising an attenuation filter that attenuates light reflected by the transparent dust prevention member.

6. The image projection apparatus according to claim 1, further comprising a reflection optical element that reflects light, which is obtained by branching the image light output from the projection portion in directions differing from a direction of the object, in a predetermined direction.

7. The image projection apparatus according to claim 6, further comprising a common light attenuation filter which is disposed in the predetermined direction and which attenuates light reflected by the transparent dust prevention member and light reflected by the reflection optical element in the predetermined direction.

8. An image projection system, comprising:
   the image projection apparatus according to claim 1;
   a terminal apparatus including:
     a receiving portion that receives an image taken by the imaging portion of the image projection apparatus from the image projection apparatus;
     a display portion that displays the received image; and
     a transmission portion that transmits an image drawing command; and
   a control unit that generates a projection image based on the image drawing command transmitted from the transmission portion, and that controls the projection portion to project the image light to the object according to the projection image.

\* \* \* \* \*